United States Patent
Hsieh

(10) Patent No.: US 6,694,785 B1
(45) Date of Patent: Feb. 24, 2004

(54) AUTOMOBILE LOCK

(76) Inventor: Hui-Hua Hsieh, P.O. Box 90, Tainan City (TW)

( * ) Notice: Subject to any disclaimer, the term of this patent is extended or adjusted under 35 U.S.C. 154(b) by 0 days.

(21) Appl. No.: 10/431,454

(22) Filed: May 8, 2003

(51) Int. Cl.⁷ .............................................. B60R 25/02
(52) U.S. Cl. ............................. 70/209; 70/226; 70/237
(58) Field of Search .......................... 70/209–212, 225, 70/226, 237, 238

(56) References Cited

U.S. PATENT DOCUMENTS

| | | | | |
|---|---|---|---|---|
| 4,848,110 A | * | 7/1989 | Kuo .......................... 70/238 X |
| 4,949,561 A | * | 8/1990 | Solow et al. ................. 70/209 |
| 5,022,246 A | * | 6/1991 | Wang .......................... 70/209 |
| 5,031,428 A | * | 7/1991 | Jan et al. ....................... 70/209 |
| 5,040,388 A | * | 8/1991 | Chen .......................... 70/209 |
| 5,113,672 A | * | 5/1992 | Wang .......................... 70/209 |
| 5,121,617 A | * | 6/1992 | Chen .......................... 70/209 |
| 5,131,245 A | * | 7/1992 | Chen .......................... 70/209 |
| 5,174,138 A | * | 12/1992 | Shen .......................... 70/209 |
| 5,179,849 A | * | 1/1993 | Wang .......................... 70/209 |
| 5,257,518 A | * | 11/1993 | Hsieh .......................... 70/209 |
| 5,284,037 A | * | 2/1994 | Chen et al. .................... 70/209 |
| 5,566,561 A | * | 10/1996 | Hucknall ....................... 70/209 |
| 5,678,433 A | * | 10/1997 | Riccitelli ...................... 70/209 |
| 6,282,930 B1 | * | 9/2001 | Strauss ......................... 70/209 |
| 6,334,345 B1 | * | 1/2002 | Lee .............................. 70/209 |
| 6,349,580 B1 | * | 2/2002 | Kuo ............................. 70/209 |
| 6,378,343 B1 | * | 4/2002 | Lee .............................. 70/209 |

* cited by examiner

Primary Examiner—Suzanne Dino Barrett

(57) ABSTRACT

An automobile lock has a body, an ejecting shaft assembly, a retaining rod, a fixing seat and a lock body. When in using, push the assembly inwardly to make a locating pin of the retaining rod disengaged from the body, pull the retaining rod outwardly to form a gap for making a steering wheel rim embraced by a holding member of the body and a retaining member of the retaining rod, and stretch the assembly outwardly to be fixed in place without being collapsed inwardly into the body, thus providing a secure lock on the steering wheel. When not in use, unlock the lock core to collapse the assembly into the body, pull the retaining rod outwardly to remove the automobile lock from the steering wheel, and withdraw the retaining rod into the body, thereby reducing the automobile lock to a minimum dimension convenient for storage.

5 Claims, 8 Drawing Sheets

AUTOMOBILE LOCK

BACKGROUND OF THE INVENTION

1. Field of the Invention

This invention relates to an automobile lock, particularly to one having a body, an ejecting shaft assembly, a retaining rod, a fixing seat and a lock body. In using, firstly the ejecting shaft assembly is pushed inwardly into the body to make a locating pin of the retaining rod urged upwards by an ejecting pin of an end inner tube of the ejecting shaft assembly to be disengaged from an engagement groove of the body so that the retaining rod may be pulled outwardly relative to the body to form a gap between a retaining member of the retaining rod and a holding member of the body for allowing a rim of an automobile steering wheel to be received in the holding member. Secondly, the retaining rod is pushed inwardly into the body to make the retaining member and the holding member coact to embrace a rim of the automobile steering wheel with the rim of the automobile steering wheel limited between the retaining member and the holding member and with the locating pin of the retaining rod engaged in the engagement groove of the body. Finally, the ejecting shaft assembly is stretched outwardly relative to the body, and a lock knob of the lock body is turned to rotate the end inner tube and at least one telescopic inner tube of the ejecting shaft assembly accordingly to be in a fixed status, and then a lock core of the lock body is locked with an engagement block of the lock body engaged in an engagement groove of the fixing seat to limit the rotation of lock knob of the lock body so as to fix the ejecting shaft assembly in place without being collapsed inwardly into the body, thus providing a secure lock on the automobile steering wheel.

When it is not used, firstly only a key is used to actuate the lock core to be in an unlocked status for allowing the engagement block of the lock body to be shrunk into the lock body and disengaged from the engagement groove of the fixing seat so that the lock knob of the lock body may be turned to rotate the ejecting shaft assembly accordingly. Secondly, the ejecting shaft assembly is withdrawn inwardly to be collapsed in the body to make the locating pin of the retaining rod urged upwards and disengaged from the engagement groove of the body so that the retaining rod may be pulled outwardly relative to the body to form the gap between the retaining member and the holding member for allowing the automobile lock to be removed from the automobile steering wheel. Finally, the retaining rod is withdrawn inwardly into the body, thereby reducing the automobile lock to a minimum dimension only occupying little space convenient for storage.

2. Description of the Prior Art

Generally speaking, as shown in FIG. 1, a known conventional automobile lock 1 mainly has a body 10 and a telescoping rod 11. The body 10 has a hook 100 formed thereon, a locking housing 101, a lock core 102 contained therein, and a passage 103 disposed therein. The telescoping rod 11 capable of being extended into the passage 103 of the body 10 has a hook 110 formed thereon in a direction opposite to the hook 100 of the body 10, and a plurality of annular grooves 111 formed thereon. In use, the telescoping rod 11 can be pulled outwards with respect to the body to make the hooks 100, 110 of the body 10 and the telescoping rod 11 respectively hooked on an automobile steering wheel to limit the rotation of the automobile steering wheel to achieve an effect of anti-theft. When it is not used, the telescoping rod 11 can be withdrawn into the body 10 to shorten the length of the conventional automobile lock 1; however, the whole length of the conventional automobile lock 1 in a withdrawn status is still too long to be stored and the dimension of the conventional automobile lock 1 occupies too much space inconvenient for carrying.

SUMMARY OF THE INVENTION

The main purpose of the invention is to offer an automobile lock convenient in operation and capable of being collapsed to reduce its whole dimension convenient for storage.

The main feature of the invention is to provide an automobiles lock including the following elements:

A body has a holding member disposed at a front portion thereof and a main tubular member disposed at a rear portion thereof. The holding member is provided with an elongated open slot disposed at an upper portion thereof. The main tubular member is provided with a passage disposed therein and extending therethrough in communication with the holding member, and the passage is provided with at least one engagement groove;

An ejecting shaft assembly is capable of being extended into and assembled with the main tubular member of the body, and is consisting of at least one telescopic outer tube, at least one telescopic inner tube, an end outer tube and an end inner tube. Each the telescopic inner tubes is provided with a projection and a slide way both disposed thereon. The end outer tube is provided with a pin hole and a through hole both disposed thereon. The end inner tube is provided with a projection, a pin hole and a slot all disposed thereon as well as an ejecting pin disposed at a front end thereof. A first pin is capable of being inserted through the pin hole of the end inner tube, and a second pin is capable of being inserted through the pin hole of the end outer tube and the slot of the end inner tube, and the first pin capable of being inserted through the pin hole of the end inner tube;

A retaining rod is capable of being extended into the body and assembled with a front end of the ejecting shaft assembly, and has a retaining member disposed at a front portion thereof. A housing is disposed behind the retaining member, and a tubular member is disposed behind the housing. The housing is provided with a pin hole disposed therein, a locating pin and a spring contained in the pin hole of the housing. A stop plate is fitted in an upper portion of the pin hole of the housing. The tubular member is provided with a passage disposed therein and extending therethrough in communication with the pin hole of the housing as well as a slide way disposed thereon;

A fixing seat is capable of being located behind and assembled with a rear end of the ejecting shaft assembly, and has a through hole disposed therein and a pin hole disposed thereon and capable of being inserted through by a second pin that is also capable of being inserted through the pin hole of the end outer tube as well as the slot of the end inner tube of the ejecting shaft assembly. The through hole is provided with an engagement groove disposed therein.

A lock body is capable of being extended into and assembled with the fixing seat, and has a lock knob disposed at one end thereof, a lock core disposed therein, and an engagement block disposed thereon and capable of being shrunk into the lock body under the actuation of the lock core. The lock core is provided with a pin hole disposed thereon and capable of being inserted in by the first pin.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
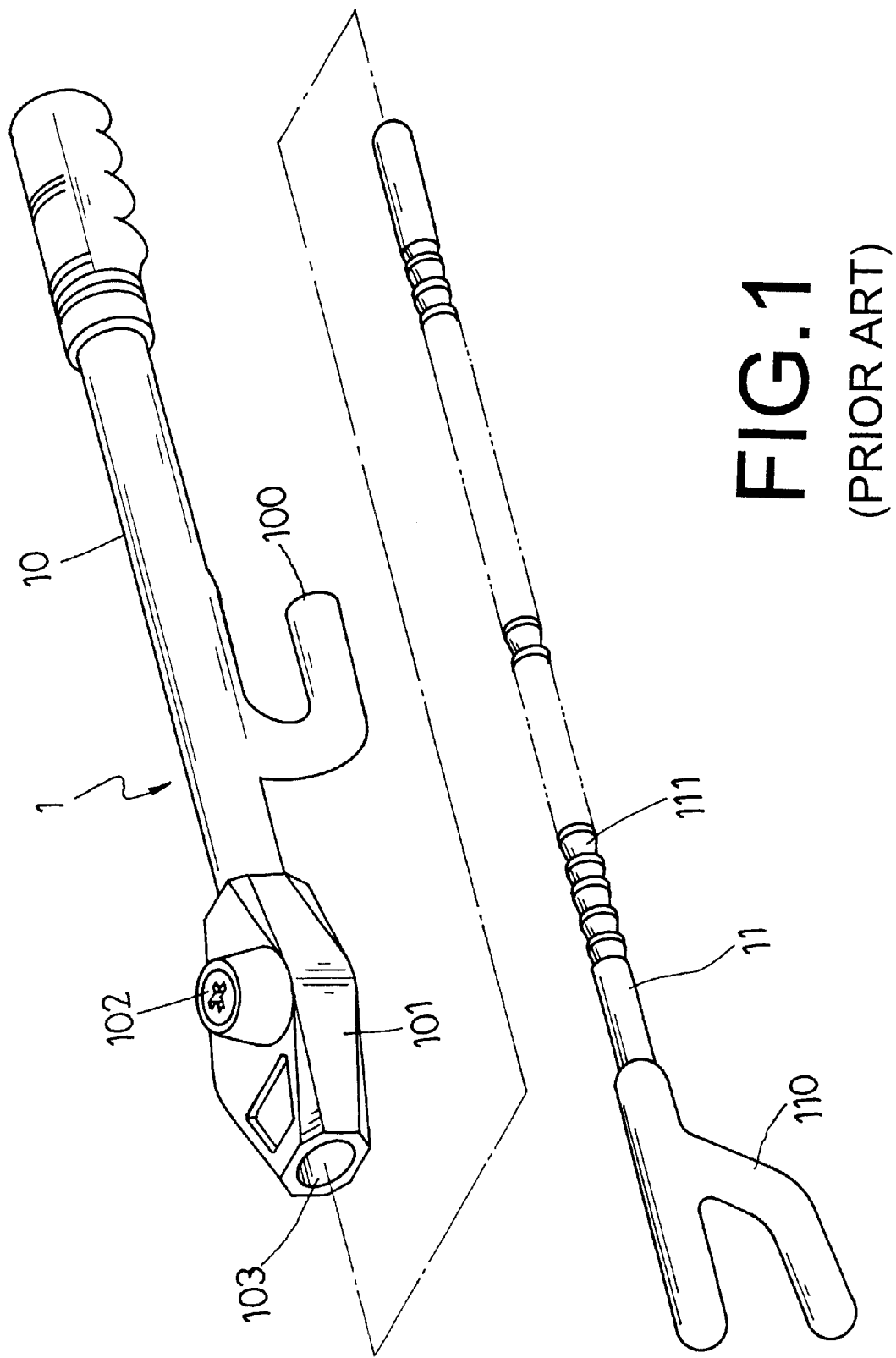
FIG. 1 is a perspective view of a known conventional automobile steering wheel lock.
Figure 2:
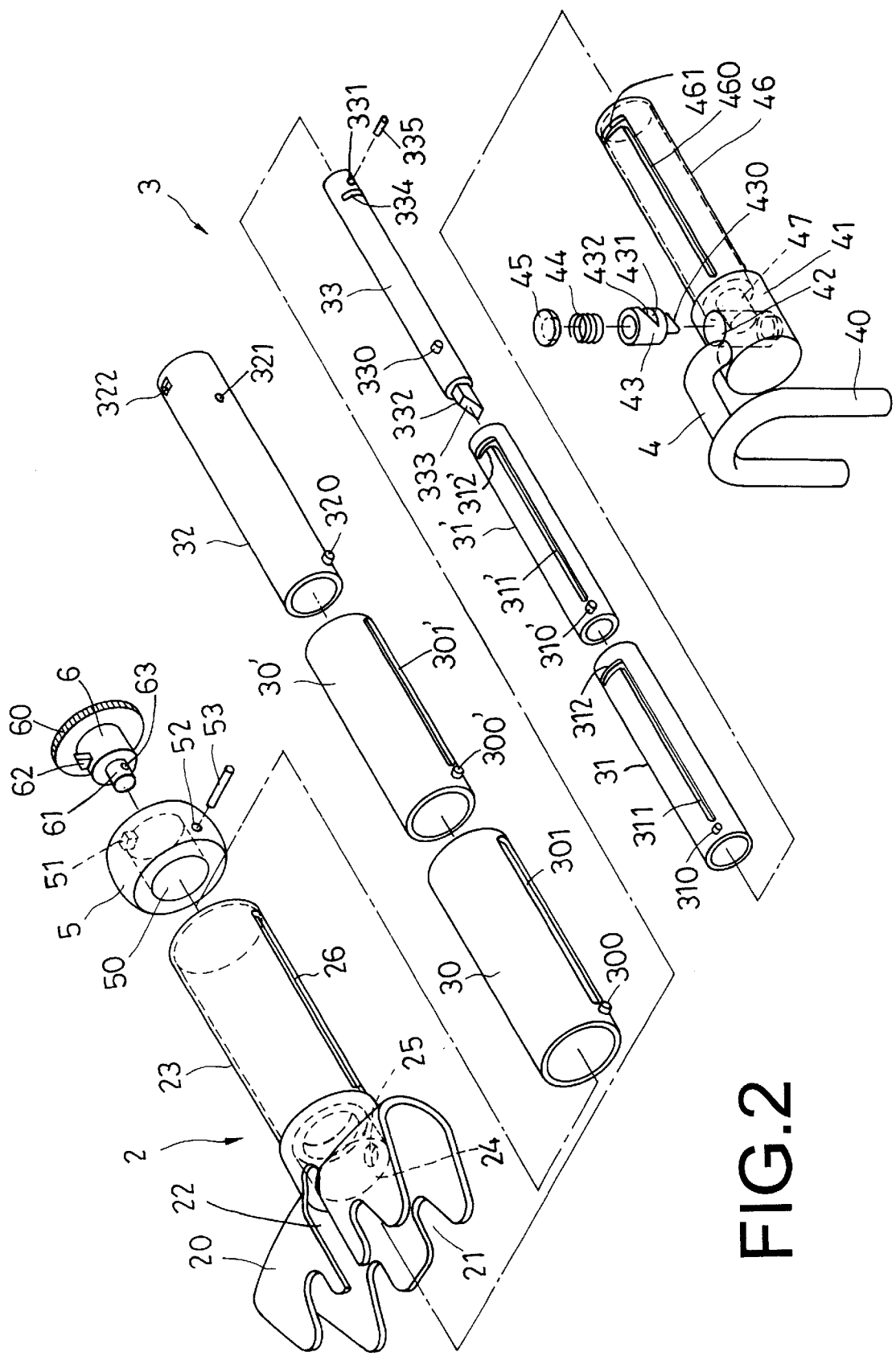
FIG. 2 is an exploded perspective view of an automobile lock in the present invention.
Figure 4:
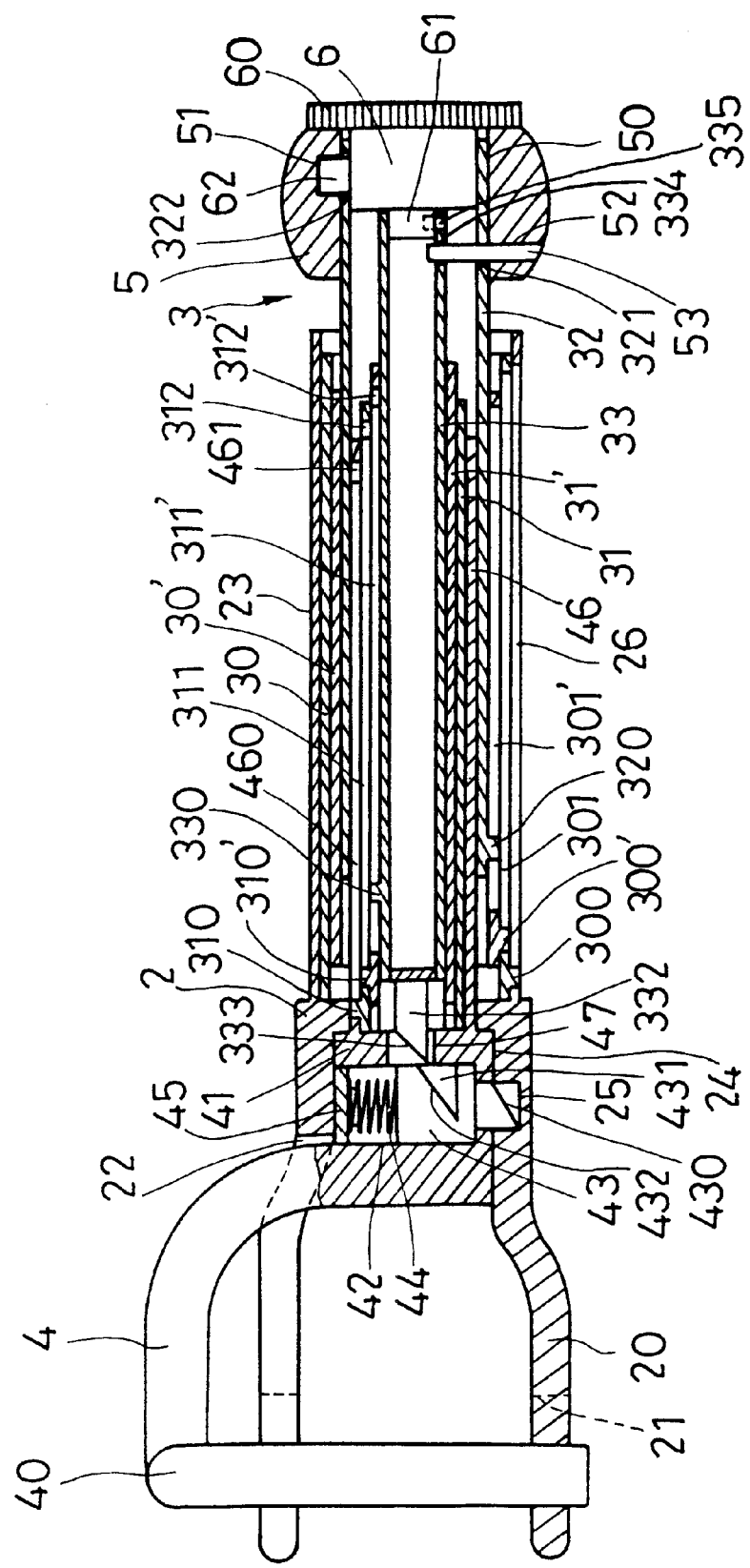
FIG. 4 is a sectional view of the automobile lock in the present invention in the collapsed status.

A preferred embodiment of an automobile lock in the present invention, as shown in FIGS. 2 and 4, mainly has a body 2, an ejecting shaft assembly 3, a retaining rod 4, a fixing seat 5 and a lock body 6.

The body 2 has a holding member 20 disposed at a front end thereof and a main tubular member 23 disposed at a rear portion thereof. The holding member 20 is provided with open slots 21 respectively disposed on an upper portion and a lower portion thereof arranged with upper ones aligned to lower ones, and an elongated open slot 22 formed on a center of the upper portion thereof. The main tubular member 23 is provided with a passage 24 disposed therein and extending therethrough in communication with the holding member 20, and a slide way 26 disposed thereon. The passage 24 is provided with an engagement groove 25 disposed therein.

The ejecting shaft assembly 3 capable of being extended into and assembled with the main tubular member 23 of the body 2 consists of a first telescopic outer tube 30, a second telescopic outer tube 30', an end outer tube 32, a first telescopic inner tube 31, a second telescopic inner tube 31', and an end inner tube 33. The first telescopic outer tube 30 is provided with a projection 300 and a slide way 301 both disposed thereon. The second telescopic outer tube 30' is provided with a projection 300' and a slide way 301' both disposed thereon. The first telescopic inner tube 31 is provided with a projection 310 and an L-shaped slide way 311 both disposed thereon. The second telescopic inner tube 31' is provided with a projection 310' and an L-shaped slide way 311' both disposed thereon. The end outer tube 32 capable of being connected to a rear portion of the second telescopic outer tube 30' is provided with a projection 320, a pin hole 321 and a through hole 322 all disposed thereon. The end inner tube 33 capable of being connected to a rear portion of the second telescopic inner tube 31' is provided with a projection 330, a pin hole 331 and a slot 334 all disposed thereon as well as an ejecting pin 332 disposed at a front end thereof. The ejecting pin 332 has a front end designed to be an inclined plane 333. A first pin 335 is capable of being inserted through the pin hole 331 of the end inner tube 33.

The retaining rod 4 capable of being extended into the body 2 and assembled with a front end of the first telescopic inner tube 31 of the ejecting shaft assembly 3 has an inverted U-shaped retaining member 40 disposed at a front portion thereof, a housing 41 disposed behind the inverted Unshaped retaining member 40, and a tubular member 46 disposed behind the housing 41. The housing 41 is provided with a pin hole 42 disposed thereon. A locating pin 43 and a spring 44 are contained in the pin hole 42 of the housing 41. The locating pin 43 has a bottom provided with a sloped surface 430 at one side thereof and a sidewall provided with an engagement notch 431 disposed thereon. The engagement notch 431 is provided with an inclined cut face 432 formed therein. A stop plate 45 is fitted in an upper portion of the pin hole 42 of the housing 41. The tubular member 46 is provided with a passage 47 disposed therein and extending therethrough in communication with the pin hole 42 of the housing 41 as well as an L-shaped slide way 460 disposed thereon.

The fixing seat 5 capable of being assembled with rear portions of the end outer tube 32 and the end inner tube 33 of the ejecting shaft assembly 3 has a through hole 50 disposed therein and a pin hole 52 disposed thereon and capable of being inserted through by a second pin 53 that is also capable of being inserted through the pin hole 321 of the end outer tube 32 as well as the slot 334 of the end inner tube 33 of the ejecting shaft assembly 3.

The through hole 50 is provided with an engagement groove 51 disposed therein.

The lock body 6 capable of being extended into and assembled with the fixing seat 5 has a lock knob 60 disposed at one end thereof, a lock core 61 disposed therein, and an engagement block 62 disposed thereon and capable of being shrunk into the lock body 6 under the actuation of the lock core 61. The lock core 61 is provided with a pin hole 63 disposed thereon and capable of being inserted in by the first pin 335.

Figure 3:
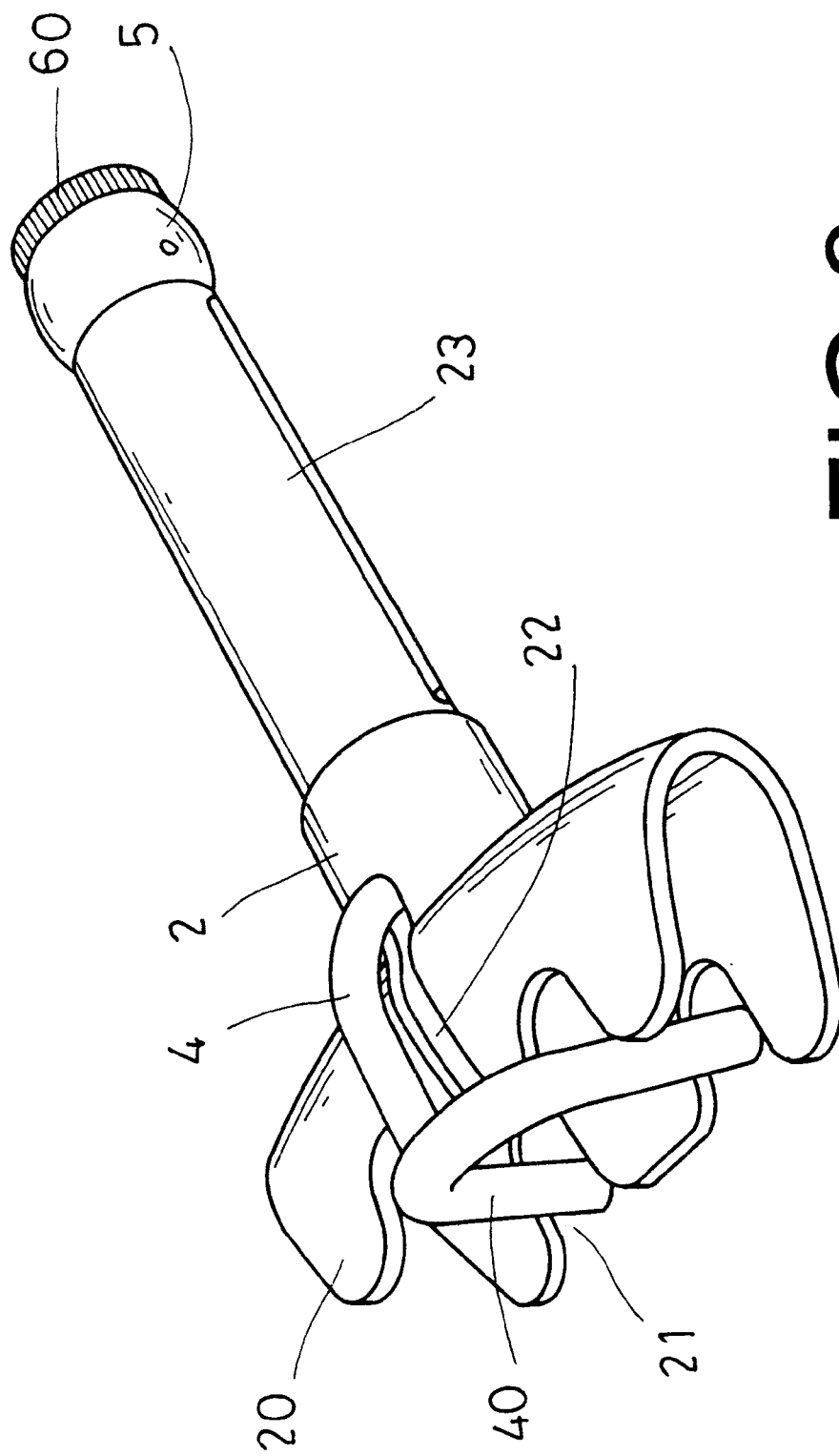
FIG. 3 is a perspective view of the automobile lock in the present invention in a collapsed status.

In assembling, referring to FIGS. 2, 3 and 4, firstly, second telescopic outer tube 30' is assembled in the first telescopic outer tube 30 with the projection 300' of the second telescopic outer tube 30' engaged with and sliding in the slide way 301 of the first telescopic outer tube 30.

Secondly, the end outer tube 32 is assembled in the second telescopic outer tube 30' with the projection 320 of the end outer tube 32 engaged with and sliding in the slide way 301' of the second telescopic outer tube 30'.

Thirdly, the combination of the first and the second telescopic outer tubes 30, 30' and the end outer tube 32 in the main tubular member 23 of the body 2 is assembled with the projection 300 of the first telescopic outer tube 30 engaged with and sliding in the slide way 26 of the main tubular member 23 of the body 2.

Fourthly, the locating pin 43 and the spring 44 is inserted into the pin hole 42 of the housing 41 of the retaining rod 4, and then the stop plate 45 is fitted in the upper portion of the pin hole 42 of the housing 41.

Fifthly, the second telescopic inner tube 31' in the first telescopic inner tube 31 is assembled with the projection 310' of the second telescopic inner tube 31' engaged with and sliding in the L-shaped slide way 311 of the first telescopic inner tube 31.

Sixthly the end inner tube 33 is assembled in the second telescopic inner tube 31' with the projection 330 of the end inner tube 33 engaged with and sliding in the L-shaped slide way 311' of the second telescopic inner tube 31'.

Seventhly, the combination of the first and the second telescopic inner tubes 31, 31' and the end inner tube 33 in the tubular member 46 of the retaining rod 4 is assembled with the projection 310 of the first telescopic inner tube 31 engaged with and sliding in the L-shaped slide way 460 of the tubular member 46 of the retaining rod 4.

Eighthly, the combination of the first and the second telescopic inner tubes 31, 31', the end inner tube 33 and the retaining rod 4 in the body 2 is assembled with the first and the second telescopic inner tubes 31, 31', the end inner tube 33 and the tubular member 46 of the retaining rod 4 all assembled in the combination of the main tubular member 23 of the body 2, the first and the second telescopic outer tubes 30, 30' and the end outer tube 32, and with the bottom of the locating pin 43 of the retaining rod 4 engaged in the engagement groove 25 of the body 2, and with the inverted U-shaped retaining member 40 of the retaining rod 4 positioned in the open slots 21 of the holding member 20 of the body 2.

Ninthly, the fixing seat 5 is assembled with the rear portions of the end outer tube 32 and the end inner tube 33.

Finally, the lock body 6 is extended into the through hole 50 of the fixing seat 5 to make the lock core 61 of the lock body 6 extended into a rear end of the end inner tube 33 and the lock knob 60 of the lock body 6 positioned behind the fixing seat 5 with the pin hole 63 of the lock body 6 aligned to the pin hole 331 of the end inner tube 33 for allowing the first pin 335 to be inserted respectively into the pin holes 331 and 63, and with the slot 334 of the end inner tube 33 aligned to the pin hole 321 of the end outer tube 32 and the pin hole 52 of the fixing seat 5 for allowing the second pin 53 to be inserted into the slot 334 and the pin hole 321 so as to have the lock body 6 securely fixed in the through hole 50 of the fixing seat 5, and with the engagement block 62 of the lock body 6 extended through the through hole 322 of the end outer tube 32 and engaged in the engagement groove 51 of the fixing seat 5, by which an assemblage of the whole structure of the automobile lock in the present invention is completed.

Figure 5:
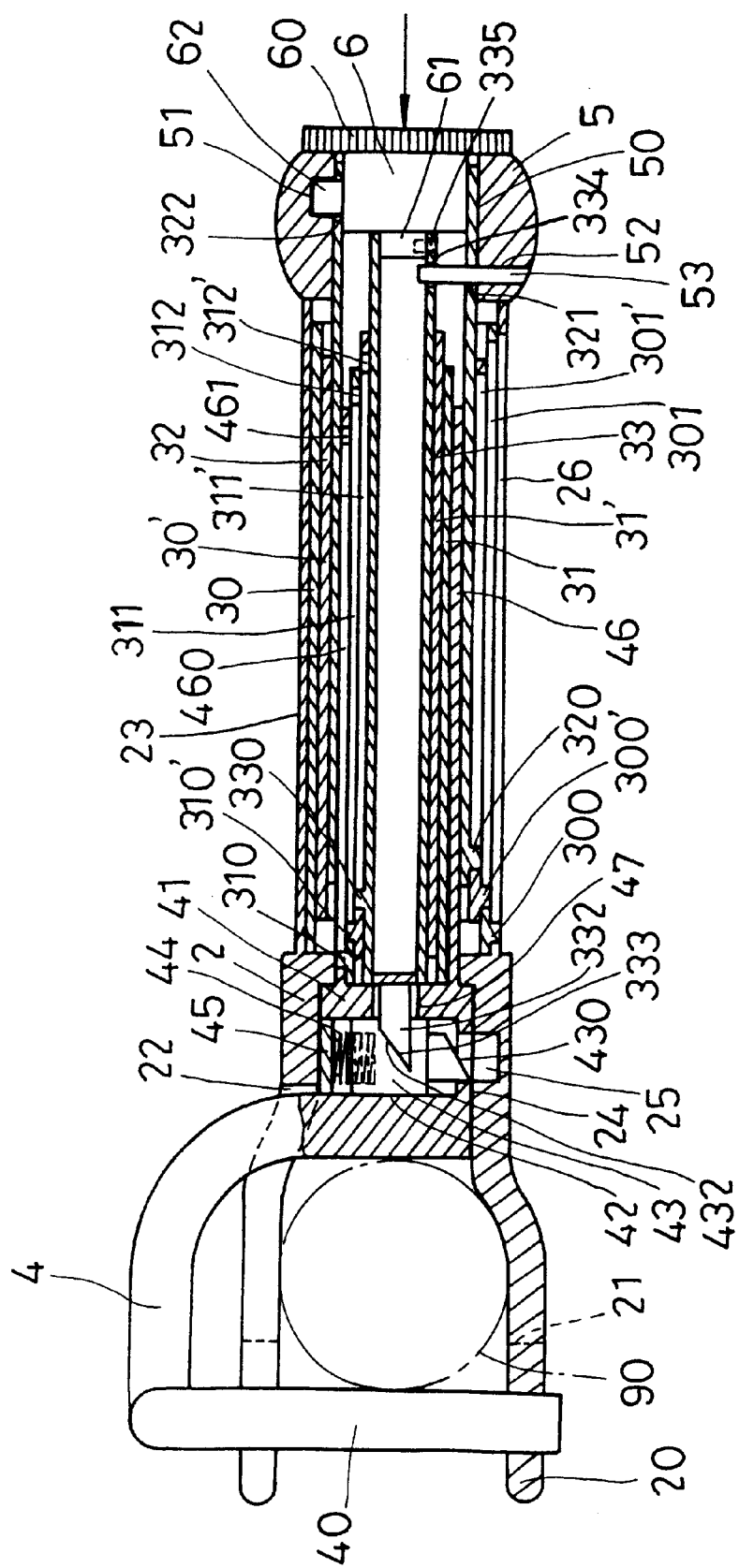
FIG. 5 is a schematic view of the automobile lock in the present invention, showing that a locating pin of the retaining rod is urged upwards by an ejecting pin of an end inner tube of the ejecting shaft assembly to be in an unlocked status.
Figure 6:
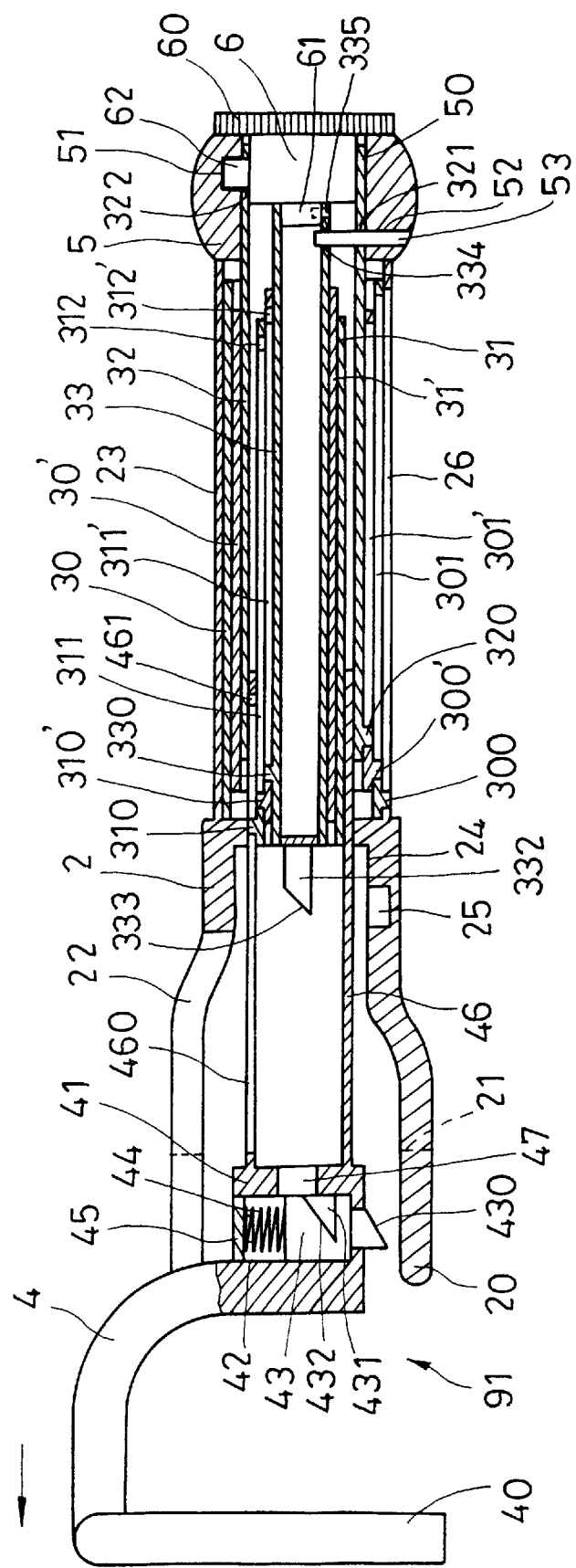
FIG. 6 is a schematic view of the automobile lock in the present invention, showing the ejecting shaft assembly being withdrawn inwardly to be collapsed in the body and the retaining rod being pulled outwardly relative to the body.

When the automobile lock of the present invention is applied on an automobile steering wheel 90, referring to FIGS. 4, 5, 6, 7 and 8, firstly the ejecting shaft assembly 3 is pushed inwardly into the body 2 to make the ejecting pin 332 of the end inner tube 33 extended into the engagement notch 431 of the locating pin 43 with the inclined plane 333 of the ejecting pin 332 touched against the inclined cut face 432 of the engagement notch 431 to make the locating pin 43 urged upwards to compress the first spring 44 and disengaged from the engagement groove 25 of the body 2, as shown in FIG. 5, so that the retaining rod 4 may be pulled outwardly relative to the body 2 without be engaged by the locating pin 43 any more so as to form a gap 91 between the retaining member 40 of the inverted U-shaped retaining rod 4 and the holding member 20 of the body 2, as shown in FIG. 6, for allowing a rim of an automobile steering wheel 90 to be received in the holding member 20.

Secondly, after the rim of the automobile steering wheel 90 is received in the holding member 20, the retaining rod 4 is pushed inwardly along the elongated open slot 22 of the holding member 20 into the passage 26 of the body 2 to make the inverted U-shaped retaining member 40 of the retaining rod 4 positioned in the open slots 21 of the holding member 20 so that the locating pin 43 of the retaining rod 4 may be urged downwards under the resilience of the spring 44 to be engaged into the engagement groove 25 of the body 2 again so as to make the automobile steering wheel 90 securely confined between the inverted U-shaped retaining member 40 and the holding member 20.

Figure 7:
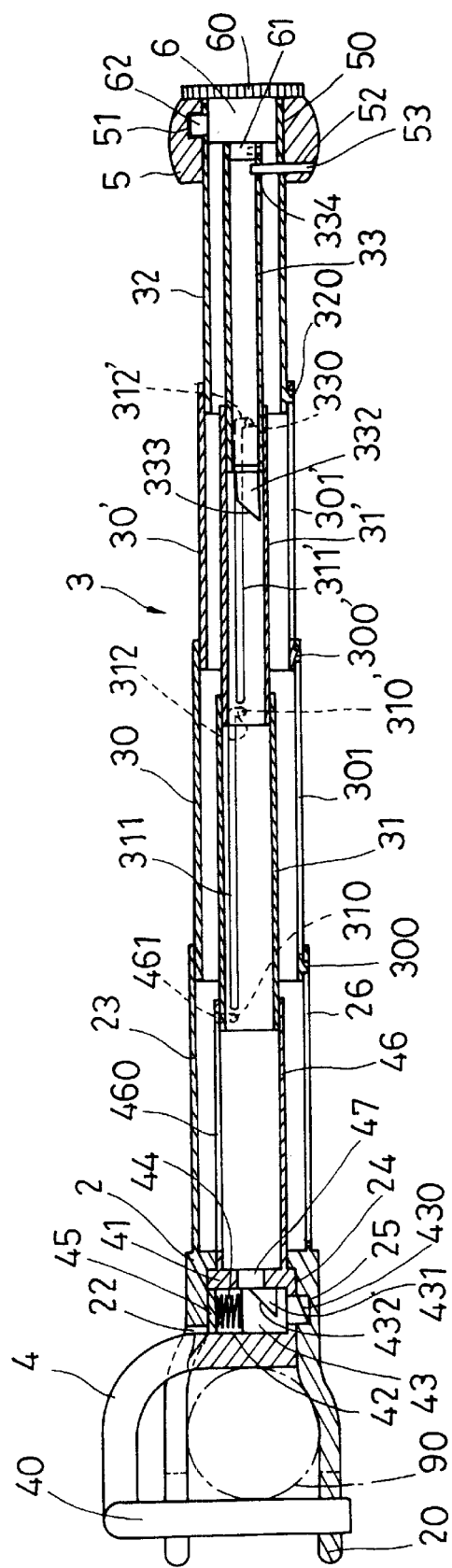
FIG. 7 is a schematic view of the automobile lock in the present invention, showing that a retaining member of the retaining rod and a holding member of the body coact to embrace a rim of an automobile steering wheel and that the ejecting shaft assembly is stretched outwardly relative to the body; and, FIG. 8 is a perspective view of the automobile lock in the present invention, showing the retaining rod being withdrawn inwardly into the body and the ejecting shaft assembly being stretched outwardly relative to the body.
Figure 8:
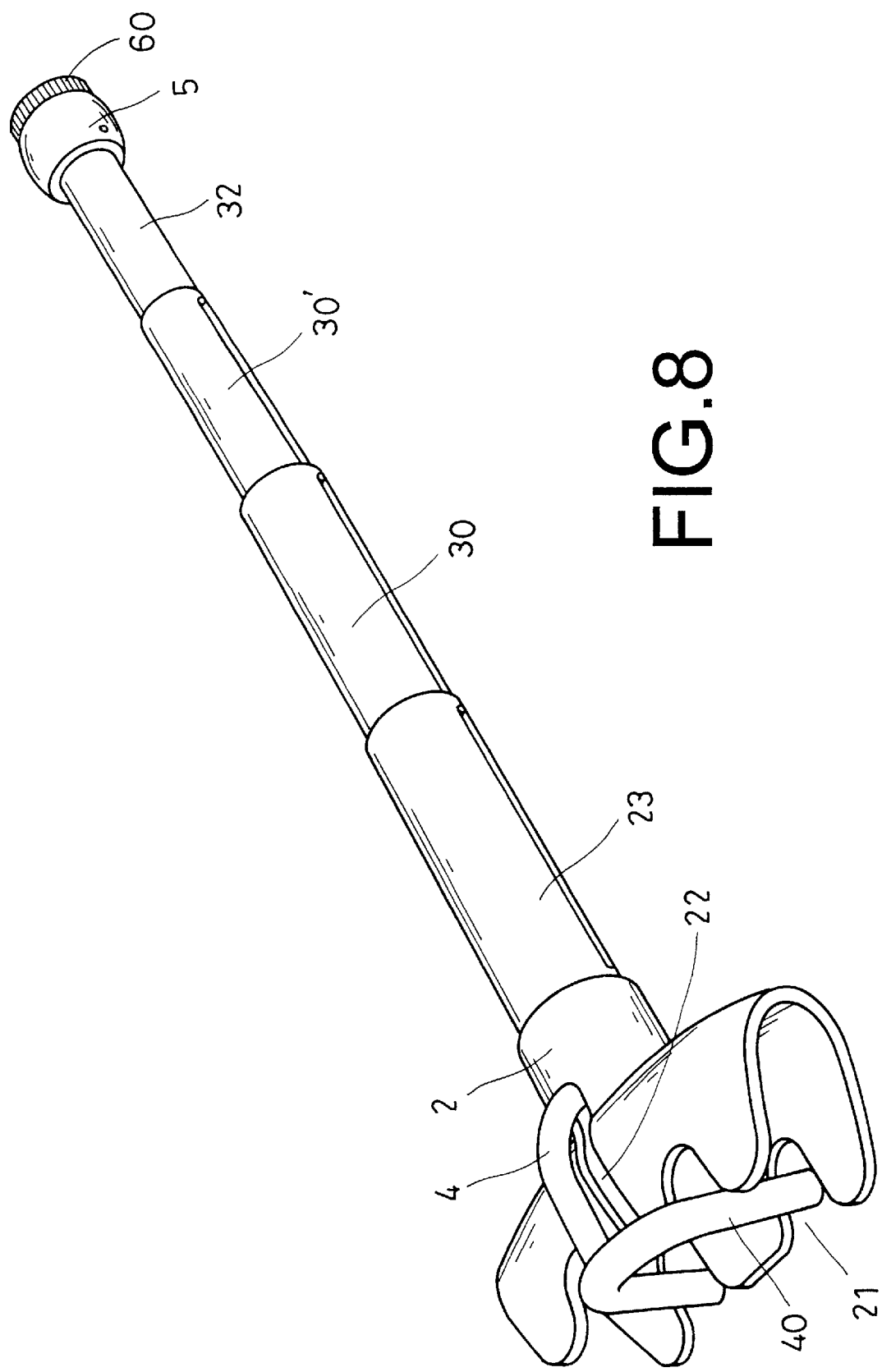

Thirdly, the ejecting shaft assembly 3 is stretched outwardly relative the body 2, as shown in FIGS. 7 and 8, with the projection 300 of the first telescopic outer tube 30 sliding outwardly along the slide way 26 of the main tubular member 23 of the body 2, and with the projection 300' of the second telescopic outer tube 30' sliding outwardly along the slide way 301 of the first telescopic outer tube 30, and with the projection 320 of the end outer tube 32 sliding outwardly along the slide way 301' of the second telescopic outer tube 30'. At the same time, the projection 310 of the first telescopic inner tube 31 will slide outwardly along the L-shaped slide way 460 of the tubular member 46 of the retaining rod 4; the projection 310' of the second telescopic inner tube 31' will slide outwardly along the L-shaped slide way 311 of the first telescopic inner tube 31. The projection 330 of the end inner tube 33 will slide outwardly along the L-shaped slide way 311' of the second telescopic inner tube 31'.

Fourthly, a key is used (not shown) to actuate the lock core 61 of the lock body 6 to be in an unlocked status, and then turn the lock knob 60 of the lock body 6 to rotate the lock core 61 to make the engagement block 62 of the lock body 6 shrunk into the lock body 6 and disengaged from the engagement groove 51 of the fixing seat 5. During the rotation, the first pin 335 that is inserted in the pin hole 63 of the lock core 61 and the pin hole 331 of the end inner tube 33 will follow the rotation of the lock core 61 to bring the end inner tube 33 to rotate accordingly, but the second pin 53 that is inserted in pin hole 321 of the end outer tube 32 and the pin hole 52 of the fixing seat 5 and protruded into the slot 334 of the end inner tube 33 only remains stationary in the slot 334 of the end inner tube 33 without following the rotation of the slot 334 of the end inner tube 33 to bring the end outer tube 32 to rotate accordingly. Moreover, the projection 330 of the end inner tube 33 will follow the rotation of the end inner tube 33 to be engaged in the bent part 312' of the L-shaped slide way 311' of the second telescopic inner tube 31' so as to bring the second telescopic inner tube 31' to rotate accordingly by which the projection 310' of the second telescopic inner tube 31' will be engaged in the bent part 312 of the L-shaped slide way 311 of the first telescopic inner tube 31 so as to bring the first telescopic inner tube 31 to rotate accordingly by which the projection 310 of the first telescopic inner tube 31 will be engaged in the bent part 461 of the L-shaped slide way 460 of the tubular member 46 of the retaining rod 4.

Finally, the engagement block 62 of the lock body 6 is protruded out of the lock body 6 to be engaged in the engagement groove 51 of the fixing seat 5 again, and then the lock core 61 of the lock body 6 is locked to limit the shrinking movement of the engagement block 62 and the rotation of the lock knob 60 so as to fix the end inner tube 33 and the first and the second telescopic inner tubes 31, 31' in place without being rotated or withdrawn into the body for facilitating the inverted U-shaped retaining member 40 of the retaining rod 4 to hold the rim of the automobile steering wheel 90 firmly, thus providing a secure lock on the automobile steering wheel 90 by limiting the rotation of the automobile steering wheel 90 so as to achieve an effect of anti-theft.

When not in use, referring to FIGS. 4, 5, 6 and 7, firstly a key is used (not shown) to rotate the lock core 61 of the lock body 6 to be in an unlocked status, then turning the lock knob 60 of the lock body 6 in a reverse direction to rotate the lock core 61 to make the engagement block 62 of the lock body 6 shrunk into the lock body 6 and disengaged from the engagement groove 51 of the fixing seat 5 and to make the first pin 335 bring the end inner tube 33 to rotate reversely accordingly by which the projection 330 of the end inner tube 33 will slide from the bent part 312' of the L-shaped slide way 311' of the second telescopic inner tube 31' back to a linear portion of the L-shaped slide way 311' to bring the second telescopic inner tube 31' to rotate reversely accordingly by which the projection 310' of the second telescopic inner tube 31' will slide back to a linear portion of the L-shaped slide way 311 of the first telescopic inner tube 31 to bring the first telescopic inner tube 31 to rotate reversely accordingly by which the projection 310 of the first telescopic inner tube 31 will slide back to a linear portion of the L-shaped slide way 460 of the tubular member 46 of the retaining rod 4.

Secondly, the ejecting shaft assembly 3 is pushed inwardly into the body 2 with the first and the second telescopic inner tubes 31, 31' and the end inner tube 33 collapsed into the tubular member 46 of the retaining rod 4 and with the first and the second telescopic outer tubes 30, 30' and the end outer tube 32 collapsed into the main tubular member 23 of the body 2.

Finally, the ejecting shaft assembly 3 is pushed further slightly inwardly to make the ejecting pin 332 of the end inner tube 33 extended into the engagement notch 431 of the locating pin 43 with the inclined plane 333 of the ejecting pin 332 touched against the inclined cut face 432 of the engagement notch 431 to make the locating pin 43 urged upwards to compress the first spring 44 and disengaged from the engagement groove 25 of the body 2 so that the retaining rod 4 in an disengaged status may be pulled outwardly relative to the body 2 to form the gap 91 between the inverted U-shaped retaining member 40 of the retaining rod 4 and the holding member 20 of the body 2, as shown in FIG. 6, for allowing the automobile lock to be removed from the automobile steering wheel 90, thereby reducing the automobile lock to a minimum dimension only occupying little space convenient for storage.

While the preferred embodiment of the invention has been described above, it will be recognized and understood that various modifications may be made therein and the appended claims are intended to cover all such modifications that may fall within the spirit and scope of the invention.

What is claimed is:

1. An automobile lock comprising:
    a body having a holding member disposed at a front portion thereof and a main tubular member disposed at a rear portion thereof, said holding member provided with an elongated open slot disposed at an upper portion thereof, said main tubular member provided with a passage disposed therein and extending therethrough in communication with said holding member, said passage provided with at least one engagement groove;
    an ejecting shaft assembly capable of being extended into and assembled with said main tubular member of said body, and consisting of at least one telescopic outer tube, at least one telescopic inner tube, an end outer tube and an end inner tube, each of said inner and outer tubes provided with a projection and a slide way both disposed thereon, said end outer tube provided with a pin hole and a through hole both disposed thereon, said end inner tube provided with a projection, a pin hole and a slot all disposed thereon as well as an ejecting pin disposed at a front end thereof, a first pin capable of being inserted through said pin hole of said end inner tube;
    a retaining rod capable of being extended into said body and assembled with a front end of said ejecting shaft assembly, and having a retaining member disposed at a front portion thereof, a housing disposed behind said retaining member, and a tubular member disposed behind said housing, said housing provided with a pin hole disposed therein, a locating pin and a spring contained in said pin hole of said housing, a stop plate fitted in an upper portion of said pin hole of said housing, said tubular member provided with a passage disposed therein and extending therethrough in communication with said pin hole of said housing as well as a slide way disposed thereon;
    a fixing seat capable of being located behind and assembled with a rear end of said ejecting shaft assembly, and having a through hole disposed therein and a pin hole disposed thereon and capable of being inserted through by a second pin that is also capable of being inserted through said pin hole of said end outer tube as well as said slot of said end inner tube of said ejecting shaft assembly, said through hole provided with an engagement groove disposed therein; and,
    a lock body capable of being extended into and assembled with said fixing seat, and having a lock knob disposed at one end thereof, a lock core disposed therein, and an engagement block disposed thereon and capable of being shrunk into said lock body under the actuation of said lock core, said lock core provided with a pin hole disposed thereon and capable of being inserted in by said first pin.

2. The automobile lock as claimed in claim 1, wherein said holding member of said body is provided with open slots formed thereon for the insertion of the retaining member of said retaining rod.

3. The automobile lock as claimed in claim 1, wherein said main tubular member of said body is provided with a slide way disposed thereon; each of said telescopic outer tubes of said ejecting shaft assembly is provided with a projection and a slide way both disposed thereon; said end outer tube of said ejecting shaft assembly is provided with a projection disposed thereon.

4. The automobile lock as claimed in claim 1, wherein said slide ways of said telescopic inner tubes of said ejecting shaft assembly and said slide way of said tubular member of said retaining rod are shaped in an L form.

5. The automobile lock as claimed in claim 1, wherein said locating pin of said retaining rod has a bottom provided with a sloped surface at one side thereof and a sidewall provided with an engagement notch disposed thereon, said engagement notch provided with an inclined cut face formed therein; wherein said ejecting pin of said end inner tube of said ejecting shaft assembly has a front end designed to be an inclined plane for corresponding to said inclined cut face of said engagement notch of said locating pin of said retaining rod.

* * * * *